United States Patent [19]

Sevastakis

[11] Patent Number: 4,719,829

[45] Date of Patent: Jan. 19, 1988

[54] METHOD AND APPARATUS FOR FORMING MATCHING TAPERED SURFACES ON INTERFITTING MALE AND FEMALE PARTS

[76] Inventor: Gus Sevastakis, 5645 Angola Rd., Toledo, Ohio 43615

[21] Appl. No.: 348,980

[22] Filed: Feb. 16, 1982

[51] Int. Cl.$^4$ .............................. B23B 5/36; B23B 3/36
[52] U.S. Cl. ........................................... 82/15; 82/16; 82/17; 82/21 A
[58] Field of Search ................... 82/16, 15, 17, 24 R, 82/21 A

[56] References Cited

U.S. PATENT DOCUMENTS

| | | | |
|---|---|---|---|
| 1,428,095 | 9/1922 | Ingle | 82/1.4 |
| 2,089,078 | 8/1937 | Tyson | 82/16 |
| 2,697,373 | 12/1954 | Siekmann et al. | 82/24 R |
| 3,630,111 | 12/1971 | Hartford et al. | 82/24 R |
| 4,151,765 | 5/1979 | Sevastakis | 82/15 |

*Primary Examiner*—Nicholas P. Godici
*Attorney, Agent, or Firm*—Barnes, Kisselle, Raisch, Choate, Whittemore & Hulbert

[57] ABSTRACT

A method and apparatus for forming tapered surfaces on male and female parts to be interfitted one within the other along the complementary tapered surfaces thereof wherein the male part is mounted on the chuck of a lathe wherein the chuck axis extends along the centerline of the lathe, the tool on the lathe is mounted for movement at an angle to the longitudinal centerline of the lathe, and the external surface of the male part is cut while rotating the part in one direction to provide a tapered surface by moving the cutting tool along a line extending at the angle. The male part is removed from the chuck and the female part is mounted on the chuck. The cutting tool is moved transversely of the lathe without changing the angle or vertical position of the cutting edge, and the internal surface of the female part is cut by moving the same cutting tool along a path parallel to the first-mentioned path of the tool while rotating the female part in the opposite direction.

6 Claims, 4 Drawing Figures

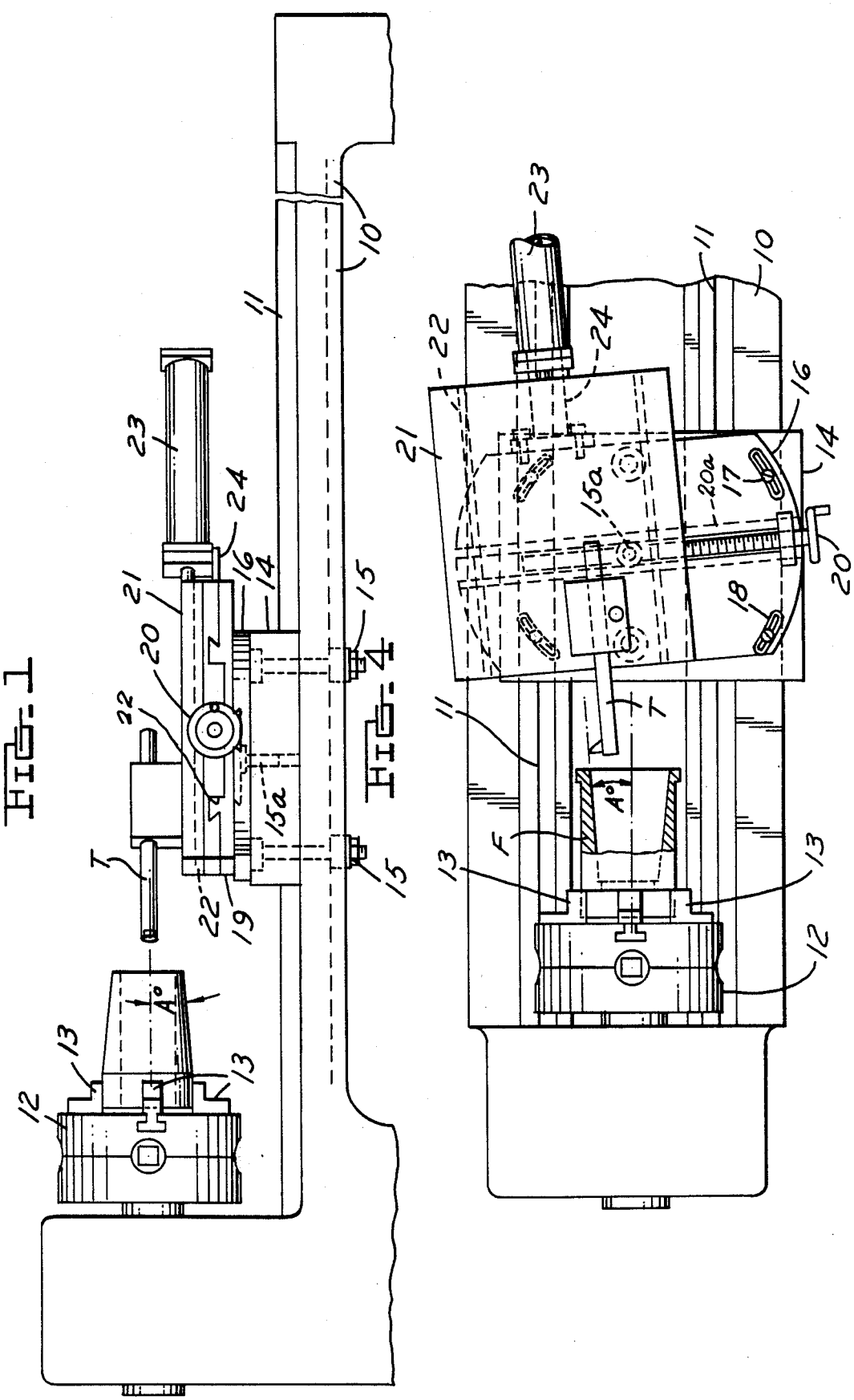

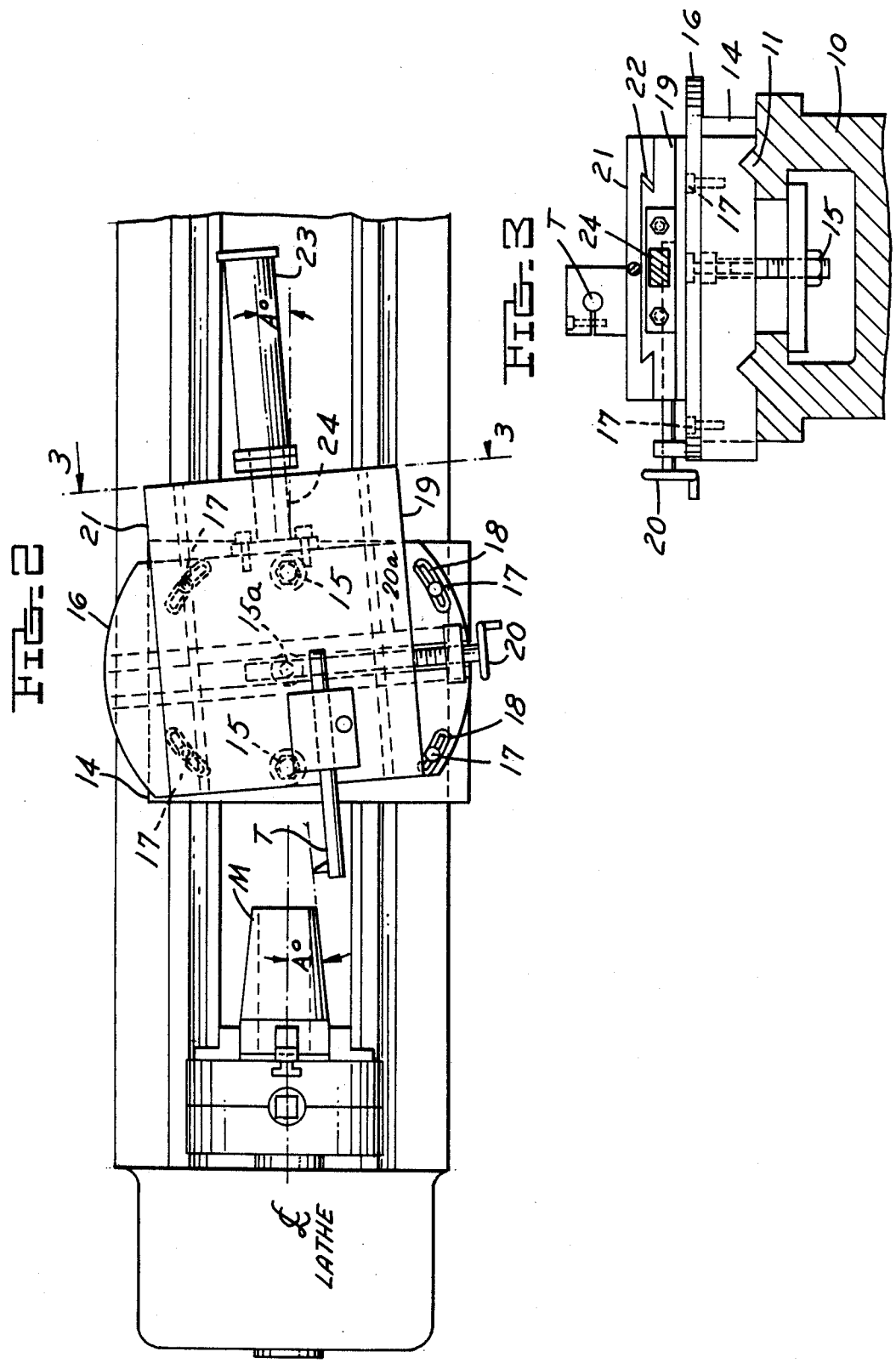

METHOD AND APPARATUS FOR FORMING MATCHING TAPERED SURFACES ON INTERFITTING MALE AND FEMALE PARTS

BACKGROUND AND SUMMARY OF THE INVENTION

In the art of continuous vertical casting of solid or tubular bar products, it is conventional to provide the external surface of one of the graphite casting dies with a taper and to seat the die in a metal cooler assembly which has a tapered internal passage receiving the tapered surface of the die. Such an assembly, for example, is shown in my U.S. Pat. No. 4,000,773, issued Jan. 4, 1977 and entitled "Die Assembly For Continuous Vertical Casting Of Tubular Metallic Products." The function of the cooler assembly is to withdraw heat from the die which is subjected to extremely high temperatures from the molten material being utilized to form the casting. In order to obtain maximum heat transfer between the cooling assembly and the die, it is important that the engaging tapered surfaces of these parts are continuous and complete contact with each other. The problem presented by the latter objective is to provide matching or complementary tapers on the outer surface of the die and the inner surface of the cooler. Heretofore, this has been accomplished by cutting the tapered surfaces on a lathe utilizing a conventional taper attachment and, to do this, it has been necessary to twice set the lathe cutting tool and lathe attachment with respect to the centerline of the lathe chuck at an angle prior to cutting the tapers on the two parts. This not only slows down the taper cutting process but furthermore subjects the operation to the risk of cutting tapers on the parts which do not exactly correspond. The entire operation relies on the accuracy of the taper attachment and the ability of the operator to set up the tool and attachment accurately. The latter can result in insufficient heat transfer between the die and the cooler which could cause failure of the casting operation. Since the dies are made from relatively expensive material and the set up and preheating before operation consumes time, premature replacement is very costly. It is desirable to be able to make a taper on the female part of the cooler assembly independently of the making of a complementary male die part so that male parts with different die openings can be utilized with the same female part.

In my U.S. Pat. No. 4,151,765 an improved method and apparatus is provided for cutting exactly matching tapers on interfitting male and female parts so as to ensure, when the parts are interfitted, there will be substantially complete and continuous contact throughout the tapered surfaces thereof. In accordance with this patent, a conventional lathe is provided with a revolving chuck at the tail end of the lathe frame which chuck is mounted on a swivel base relative to the lathe bed so as to permit the revolving chuck to be set at a desired taper angle relative to the longitudinal centerline of the lathe. The revolving chuck has multiple jaws which may engage a workpiece externally of the workpiece or internally of the workpiece when the workpiece is a hollow member or sleeve. The revolving chuck is also provided with a suitable motor, for example, an electric motor, for operating the drive shaft to which the chuck is mounted to rotate therewith. In order to cut matching tapers on male and female parts, both of which are sleevelike members, the chuck is adjusted to a desired tapered angle relative to the longitudinal centerline of the lathe; the taper angle corresponding to the angle of the taper to be cut on the parts. One of the parts is then mounted to the chuck of the tail stock and, assuming this part is a male part, the jaws of the chuck extend into the passage of the male part and grip the internal surfaces thereof to hold the part at the desired taper angle. The tool carriage of the lathe and the cross slide and the compound slide thereof which support the cutting tool, are then adjusted to bring the cutting tool into the proper position relative to the external surface of the male part to be cut with the taper. The carriage of the lathe is set to reverse travel. The male part is then rotated by energizing the motor associated with the chuck in one direction and the cutting tool is then moved horizontally along a horizontal path parallel to the centerline of the lathe to cut the desired taper into the external surface of the male part. Upon completion of the tapered surface, the male part is removed from the chuck of the revolving chuck, and the female part is then mounted in the chuck by engaging the chuck jaws with the external surface of the female part. Without changing the angular setting of the cutting tool relative to the longitudinal centerline of the lathe, the cross slide is moved transversely relative to the longitudinal centerline of the lathe to position the cutting tool within the hollow passage of the female part. The motor is then energized to rotate the female part, but in a direction opposite that in which the male part was driven; and the cutting tool is then moved horizontally along the bed of the lathe to cut a taper along the internal surface of the female part. The resulting tapered surface cut on the female part will be at the exact same angle as the tapered surface cut on the male part, however, these surfaces will be complementary to each other so that these parts will interfit, one within the other, along the cut tapered surfaces thereof.

It is a primary object of the present invention to provide an improved method and apparatus for cutting exactly matching or complementary tapers on male and female parts to be interfitted along their tapered surfaces; and which will permit identical but complementary tapers to be cut on male and female parts to be interfitted along their tapered surfaces, with an extremely high degree of accuracy and efficiency and without requiring any special skills from the lathe operator; which apparatus is very economical to build, easy to maintain and operate without skilled labor, does not require taper attachments and which can be used to make a plurality of complementary interfitting parts having high accuracy. Although the present invention is particularly suitable for cutting matching or complementary tapers on a die for continuous vertical casting and an associated cooling sleeve which receives the die, the present invention may well have applicability elsewhere.

In accordance with the invention, the method and apparatus for forming tapered surfaces on male and female parts to be interfitted one within the other along the complementary tapered surfaces thereof which comprises mounting the male part on the chuck of a lathe wherein the chuck axis extends along the centerline of the lathe, positioning a tool on the lathe for movement at predetermined angle to the longitudinal centerline of the lathe, cutting the external surface of the male part to provide a tapered surface by moving the cutting tool along a line extending at said angle while the chuck is rotating in one direction, then removing the male part from the chuck, mounting the female part on the chuck, moving the cutting tool transversely of the lathe without changing the angle of height of the cutting tool, cutting the internal surface of the female part by moving the same cutting tool along a path parallel to the first-mentioned path of the tool while rotating the chuck in the opposite direction.

DESCRIPTION OF THE DRAWINGS

FIG. 1 is a fragmentary elevational view of an apparatus embodying the invention.

FIG. 2 is a fragmentary plan view of the apparatus.

FIG. 3 is a fragmentary sectional view taken along the line 3—3 in FIG. 2.

FIG. 4 is a fragmentary plan view similar to FIG. 1 showing the apparatus in a different operative position.

DESCRIPTION

Referring to the drawings, the apparatus embodying the invention comprises portions of a conventional lathe which includes a base 10 having guide rails 11 and a rotatable motor driven chuck 12 having multiple jaws 13 for gripping a part or workpiece.

In accordance with the invention, the apparatus includes a base plate 14 that is mounted on the guide rails 11 by longitudinally spaced bolts 15 and supports a rotatable plate 16 mounted for rotation about the axis of a headed pin 15a dropped in a recess in plate 16 and extending into base plate 14, which axis intersects the longitudinal axis or centerline of the lathe. The rotatable plate 16 is adapted to be locked in a predetermined angular position by bolts 17 extending through arcuate slots 18 into the base plate 14. Rotatable plate 16, in turn, supports a first cross slide 19 by a dovetail 20a operated by a hand wheel 20 in a conventional well-known manner so that the cross slide 19 can be translated or moved transversely to the centerline of the lathe. Cross slide 19 further supports a second cross slide 21 by a dovetail construction 22 so that the second slide 21 can be moved at an angle to the first cross slide 19, preferably 90°. Finally, means are provided for moving the second slide 21 relative to the first slide 19 and includes a fluid operated cylinder 23, such as a hydraulic cylinder which has its housing fixed to the first slide 19 and has its shaft connected to the second slide 21. A base 24 is provided on slide 21 to support the cylinder 23. A tool T is supported on the second slide 21. The hydraulic cylinder 23 includes controls for metering the fluid so that the tool T is moved at a uniform rate.

With the parts adjusted so that the axis of the second slide 21 moves at an angle to the centerline of the lathe, the tool T will move at a uniform rate at a corresponding angle when the hydraulic cylinder 23 is actuated.

In forming the parts, a male part M is mounted in the jaws 13 of the chuck 12 and the tool T is then moved into position adjacent the outer surface of the part M by the hand wheel 20. Actuation of the hydraulic cylinder 23 at a uniform rate while the part is rotated in one direction causes the tool T to move at the predetermined angle A forming the external surface of the male part as shown in FIG. 2.

Referring to FIG. 4, the male part is then removed and the female part F is placed in jaws 13 of the chuck 12. Without changing the angular position of the tool T relative to the centerline of the lathe or the height of the cutting edge, the tool T is translated by the hand wheel 20 to bring the cutting portion of the tool into position for cutting the internal taper on the part M. The hydraulic cylinder 23 is then actuated to cut the complementary taper on the part F at a uniform rate. While the part is rotated in the reverse or opposite direction that part M was rotated.

Although the method has been described wherein the surface is formed on the part M before the surface on the part F, the steps can be reversed, cutting the female part F first and then cutting the male part.

It can thus be seen that there has been provided a method and apparatus that produces accurate mating parts, which apparatus is economical to build and is easy to maintain and operate, and which can be used to make a plurality of interchangeable taper parts all without the use of taper attachments.

I claim:

1. An apparatus for forming matching tapered surfaces on male and female parts to be interfitted one within the other along complementary tapered surfaces thereof comprising a lathe having a bed with guide rails parallel to the centerline of the lathe, a head stock with a rotatable driven chuck having its axis along the centerline of the bed, a tool carriage mounted on the guide rails comprising a fixed member, means for clamping said fixed member to said guide rails, a rotatable member rotatably mounted on said fixed member about a vertical axis intersecting the horizontal axis of the lathe, means for locking said rotatable member in a predetermined angular position said fixed member, a first cross slide on said rotatable member, means for translating said first cross slide and holding said cross slide in position with respect to said rotatable member, a second cross slide on said first cross slide movable along an axis forming an angle with the direction of movement of said first cross slide, a cutting tool on said second cross slide, and means on said cross slide for moving said second cross slide with respect to said first cross slide such that the tool is moved at an angle to the centerline of the lathe.

2. The apparatus set forth in claim 1 wherein said means for locking said rotatable member in position comprises a plurality of screws, said rotatable member having elongated slots through which screws extend into threaded relationship with the fixed member on the guide rails.

3. The apparatus set forth in claim 1 wherein said means for translating said cross slide is manually operated.

4. The apparatus set forth in claim 1 wherein said means for translating said second cross slide comprises a power driven actuator on said second cross slide.

5. The apparatus set forth in claim 4 wherein said power actuator comprises a fluid operated cylinder mounted on said first cross slide and operatively connected to the second cross slide.

6. An apparatus for forming matching tapered surfaces on male and female parts to be interfitted one within the other along complementary tapered surfaces thereof comprising a lathe having a bed with guide rails parallel to the centerline of the lathe, a head stock with a rotatable chuck having its axis along the centerline of the bed, a tool carriage mounted on the guide rails comprising a fixed member, means for clamping said fixed member to said guide rails, a rotatable member rotatable about a vertical axis intersecting the horizontal axis of the lathe, means for locking said rotatable member in a predetermined angular position comprising a plurality of screws, said rotatable member having elongated slots through which screws extend into threaded relationship with the fixed member on the guide rails, a first cross slide on said rotatable member, manually operated means for translating said cross slide and holding said cross slide in position with respect to said rotatable member, a second cross slide on said first cross slide movable along an axis forming an angle with the direction of movement of said first cross slide, a cutting tool on said second cross slide, and fluid operated means on said first cross slide for moving said second cross slide with respect to said first cross slide such that the tool is moved at a predetermined angle to the centerline of the lathe.

* * * * *